United States Patent [19]

Byrd

[11] Patent Number: 5,638,045

[45] Date of Patent: Jun. 10, 1997

[54] VEHICLE SIGNAL LIGHT SYSTEM

[76] Inventor: Edward Byrd, Stubbins, East Ogwell, Devon, England, TQ12 6AW

[21] Appl. No.: 421,913

[22] Filed: Apr. 13, 1995

[51] Int. Cl.$^6$ .................................. B60Q 1/44; B60Q 1/02
[52] U.S. Cl. ...................... 340/479; 340/469; 340/457.2; 315/82; 315/83; 307/10.8
[58] Field of Search .................... 340/479, 469, 340/641, 642, 457.2; 315/82, 83; 307/10.8

[56] References Cited

U.S. PATENT DOCUMENTS

| | | | |
|---|---|---|---|
| 2,897,479 | 7/1959 | Keegin | 340/469 |
| 3,148,306 | 9/1964 | Onksen et al. | 340/469 |
| 3,206,723 | 9/1965 | Doane | 340/469 |
| 3,244,934 | 4/1966 | Webb | 340/469 |
| 3,277,442 | 10/1966 | Kearney | 340/469 |

FOREIGN PATENT DOCUMENTS

| | | |
|---|---|---|
| 146616 | 7/1920 | United Kingdom . |
| 703724 | 2/1954 | United Kingdom . |
| 946633 | 1/1964 | United Kingdom . |
| 1239523 | 7/1971 | United Kingdom . |
| 1383468 | 2/1975 | United Kingdom . |

*Primary Examiner*—Donnie L. Crosland
*Attorney, Agent, or Firm*—Stephen R. Greiner

[57] ABSTRACT

An external signal light system with two intensity levels. The system includes a dual-filament lamp bulb to alert observers that the vehicle brakes are being actuated. A power circuit connected to the vehicle storage battery provides electrical current to the bulb through a pair of serially connected switches. A first switch is closed upon actuation of the automobile's brakes. A second switch, controlled by a relay, delivers electrical current through the power circuit to either one of the bulb filaments in response to the energization state of the vehicle headlights. In the event that the headlights are energized, the second switch directs electrical current to the bulb's high wattage filament upon actuating the brakes. When the headlights are de-energized, however, electrical current is directed to the low wattage filament upon actuation of the brakes.

3 Claims, 1 Drawing Sheet

VEHICLE SIGNAL LIGHT SYSTEM

FIELD OF THE INVENTION

The present invention relates generally to land vehicle alarms and indicators and, in particular, to an external signal light system with two intensity levels.

BACKGROUND OF THE INVENTION

Motor vehicles are typically equipped with external lights to indicate their approach to nearby observers. In addition to turn signal lights, and headlights for nighttime operation, most vehicles are provided with at least one brake or stop indicator light. In known vehicle signal light systems, the stop indicator lights have been unsatisfactory because if they are of sufficient luminosity to command attention during daylight driving conditions, they are too dim or indistinct to be readily observed during nighttime use. A need, therefore, exists for an improved vehicle signal light system having means for automatically adjusting the intensity of a stop indicator light for daytime or nighttime driving conditions.

SUMMARY OF THE INVENTION

In view of the problems inherent in the prior art, it is a principal object of the invention to provide an improved vehicle signal light system which includes an electrical power source and at least one headlight and a dual-filament lamp bulb in electrical communication therewith. A light switch, connected between the power source and the headlight, is provided for regulating headlight operation. A dual-position switch, connected between the power source and the dual-filament bulb, on the other hand, is provided for the alternative energization of the dual-filament lamp bulb's high wattage filament or low wattage filament. A relay, having a first terminal connected to a junction between the light switch and the headlight and a grounded second terminal, controls the dual-position switch. A brake-actuated switch is connected between the power source and the dual-position switch.

It is an additional object of the invention to provide improved elements and arrangements thereof in a vehicle signal light system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The present invention may be more readily described with reference to the accompanying drawing, in which.

Similar reference characters denote corresponding features consistently throughout the accompanying drawings.

DETAILED DESCRIPTION OF THE PREFERRED EMBODIMENT

Figure 1:
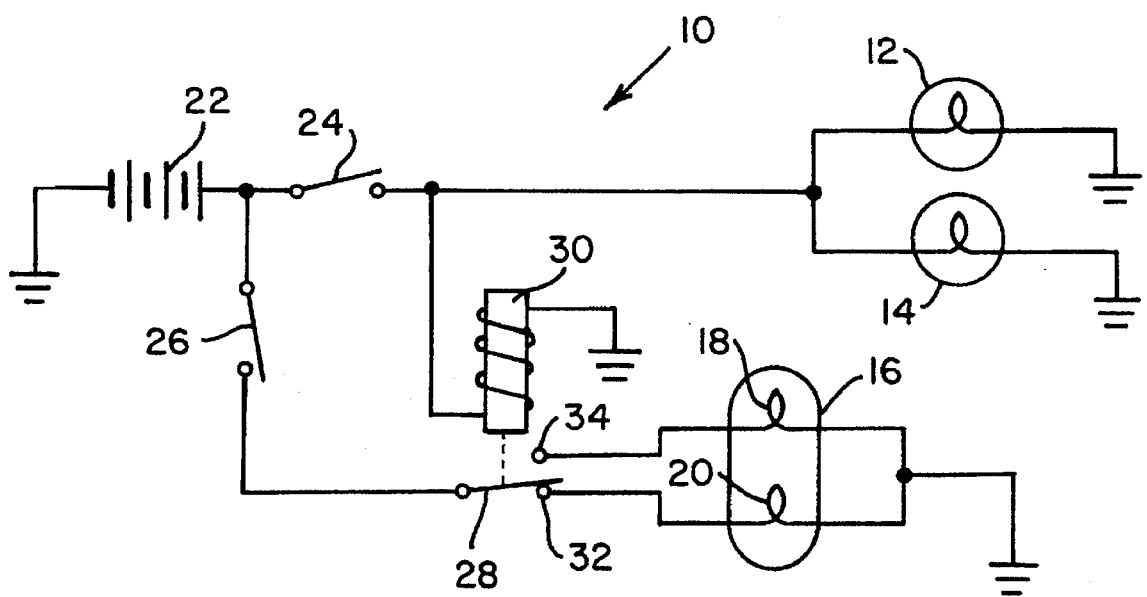
FIG. 1 is a schematic electrical circuit diagram of a vehicle signal light system in accordance with the present invention.

Referring now to FIG. 1, a vehicle signal light system 10 in accordance with the present invention is shown. The system comprises headlights 12 and 14 and stop indicator light 16 preferably located at the forward end of the vehicle. The stop indicator light 16 employs a conventional dual-filament lamp bulb having a selectively energizable high wattage and low wattage filaments 18 and 20, respectively. Each of the vehicle lights 12, 14, and 16 may be selectively energized by connection to a suitable D.C. power source such as vehicle storage battery 22.

Headlights 12 and 14 are connected to the vehicle storage battery 22 through a manually-operable switch 24 preferably positioned within the vehicle passenger compartment for ready access. The stop indicator light 16, on the other hand, is connected to the battery 22 through a pair of serially arranged switches 26 and 28. Preferably, switch 26 is adapted for movement into a closed or "on" position when the vehicle brake pedal (not shown) is depressed in the usual manner by one actuating the vehicle brakes. As shown, switch 28 is of the dual-position type and is operatively controlled by a relay 30 actuated and powered when the headlights 12 and 14 are energized through the selective closing of switch 24.

With continuing reference to FIG. 1, the relay 30 may be seen to have one of its terminals connected to a junction in the electrical lead extending from the headlights 12 and 14 to the manually-operable switch 24 while the other one of its terminals is suitably grounded. In this fashion, energization of the relay 30 is effectively controlled by operation of the switch 24. During daytime use, then, switch 24 is normally open so as to retain headlights 12 and 14 in a de-energized state. Thus, no electrical current may flow through relay 30 and the low wattage electrical contact 32 is selectively engaged by the switch 28. Upon closing switch 26, only low wattage filament 20 is energized. The high wattage filament 18 is thus placed out of the circuit during normal daytime driving conditions. At night, however, the switch 24 is typically closed to energize the headlights 12 and 14, as a result of which the relay 30 is actuated, thereby causing switch 28 move from engagement with low wattage electrical contact 32 and into electrical communication with high wattage electrical contact 34. Now, upon closing switch 26, only high wattage filament 18 is energized. The system 10 is, thus, one which automatically adjusts the luminosity of the stop indicator light 16 for day and nighttime use so as to provide a clear indication to an observer that a vehicle is being slowed by the application of its brakes.

While the invention has been described with a high degree of particularity, it will be appreciated by those skilled in the art that numerous modifications and substitutions may be made thereto. For example, a suitable filter may be positioned over stop indicator light 16 to cause such to emit light having a high visibility color such as green or red. Additionally, plural stop indicator lights 16, controlled through the operation of a single relay 30, may be provided. Thus, the plural lights 16 may be mounted upon multiple vehicle surfaces to alert observers, other than those positioned in front of the vehicle, that the vehicle brakes are being applied. Further, while system 10 is believed to provide maximum safety for a user when the high wattage filament 18 is utilized to display a vehicle braking condition at night and low wattage filament is similarly utilized by day, such a mode of operation may be readily reversed by interchanging the positions of electrical contacts 32 and 34 to reduce nighttime glare if desired. Therefore, it is to be understood that the present invention is not limited to the sole embodiment described above, but encompasses any and all embodiments within the scope of the following claims.

I claim:

1. A vehicle signal light system, comprising:
   an electrical power source;
   a headlight in electrical communication with said power source;

a light switch connected between said power source and said headlight for regulating the operation of said headlight;

a dual-filament lamp bulb having a high wattage filament and a low wattage filament in alternative electrical communication with said power source;

a dual-position switch connected between said power source and said dual-filament bulb for the alternative energization of either said high wattage filament or said low wattage filament;

a relay for controlling said dual-position switch, said relay having a first terminal connected to a junction between said light switch and said headlight and a grounded second terminal; and, a brake-actuated switch connected between said power source and said dual-position switch.

2. A vehicle signal light system, comprising:

a storage battery;

a pair of headlights, located on the front of a vehicle, in electrical communication with said storage battery;

a light switch connected between said storage battery and said pair of headlights for regulating the operation of said pair of headlights;

a dual-filament lamp bulb, positioned between said pair of headlights, having a high wattage filament and a low wattage filament in alternative electrical communication with said storage battery;

a dual-position switch connected between said storage battery and said dual-filament bulb for the alternative energization of either said high wattage filament or said low wattage filament;

a relay for controlling said dual-position switch, said relay having a first terminal connected to a junction between said light switch and said pair of headlights and a grounded second terminal; and, a brake-actuated switch connected between said storage battery and said dual-position switch.

3. A signal light system, comprising:

an electrical power source;

a first lamp bulb in electrical communication with said power source;

a light switch connected between said power source and said first lamp bulb for operating said first lamp bulb;

a dual-filament lamp bulb having a high wattage filament and a low wattage filament in alternative electrical communication with said power source;

a dual-position switch connected between said power source and said dual-filament lamp bulb for the alternative energization of either said high wattage filament or said low wattage filament;

a relay for controlling said dual-position switch, said relay connected in parallel with said first lamp bulb and in series with said light switch; and, a switch connected in electrical series between said power source and said dual-position switch.

* * * * *